United States Patent
Eguchi et al.

(10) Patent No.: US 7,092,007 B2
(45) Date of Patent: Aug. 15, 2006

(54) VEHICULAR FORWARD-VISION DISPLAY SYSTEM DECREASING LUMINANCE WITH DECREASING VEHICLE SPEED

(75) Inventors: Shotaro Eguchi, Kariya (JP); Hideki Senoo, Kariya (JP); Hirokazu Takagi, Nagoya (JP); Yasuo Hirayama, Toyota (JP); Yoshihiko Goto, Toyota (JP)

(73) Assignee: Denso Corporation, Kariya (JP)

( * ) Notice: Subject to any disclaimer, the term of this patent is extended or adjusted under 35 U.S.C. 154(b) by 310 days.

(21) Appl. No.: 10/434,117

(22) Filed: May 9, 2003

(65) Prior Publication Data

US 2004/0017282 A1    Jan. 29, 2004

(30) Foreign Application Priority Data

Jul. 29, 2002 (JP) ............... 2002-219849

(51) Int. Cl.
*H04N 7/18* (2006.01)
(52) U.S. Cl. ............... 348/148; 348/153; 348/234; 348/207; 340/901; 340/425; 340/461; 307/10.1; 250/334; 250/351
(58) Field of Classification Search ............... 348/148, 348/153, 207, 234; 340/901, 425, 461; 307/9.1, 307/10.1; 250/334, 351
See application file for complete search history.

(56) References Cited

U.S. PATENT DOCUMENTS

| | | | | |
|---|---|---|---|---|
| 5,796,350 A | * | 8/1998 | Fuse | 340/815.75 |
| 6,291,906 B1 | * | 9/2001 | Marcus et al. | 307/10.1 |
| 6,580,373 B1 | * | 6/2003 | Ohashi | 340/901 |
| 6,700,124 B1 | * | 3/2004 | Mekata et al. | 250/351 |

FOREIGN PATENT DOCUMENTS

| | | |
|---|---|---|
| JP | A-H02-189245 | 7/1990 |
| JP | A-H06-107036 | 4/1994 |

\* cited by examiner

*Primary Examiner*—Shawn S. An
(74) *Attorney, Agent, or Firm*—Posz Law Group, PLC

(57) ABSTRACT

A vehicular forward-vision display system includes a night-vision camera for scanning a nighttime image ahead of a vehicle and a head-up display for displaying the scanned nighttime image as a virtual image on a front windshield. Luminance of the displayed image is decreased with decreasing vehicle speed. The luminance of the nighttime image is thereby decreased under a low speed where vision aid is not so necessary. This decreasing of the luminance results in giving a driver relief from the bother of being caught by the scanned image displayed on the front windshield.

7 Claims, 5 Drawing Sheets

VEHICULAR FORWARD-VISION DISPLAY SYSTEM DECREASING LUMINANCE WITH DECREASING VEHICLE SPEED

CROSS REFERENCE TO RELATED APPLICATIONS

This application is based on and incorporates herein by reference Japanese Patent Application No. 2002-219849 filed on Jul. 29, 2002.

1. Field of the Invention

The present invention relates to a vehicular forward-vision display system for scanning a nighttime image ahead of a vehicle and for displaying the scanned image as a virtual image on a front windshield. In particular, luminance of the displayed image is decreased with decreasing vehicle speed.

2. Background of the Invention

At night, an image in a nighttime dark area cannot be visible by a naked eye of a driver in a long distance where headlights of a vehicle cannot reach (e.g., about 100 to 400 m ahead of a vehicle). This invisibility of the nighttime image may lead to a traffic accident.

A vehicular forward-vision display system is proposed in JP-A-H6-107036 for assisting safe driving by providing vision aid for nighttime vision of a driver. In the system, a hardly visible nighttime image is scanned by a night-vision camera and displayed as a virtual image on a windshield of a vehicle.

In the above system, when the scanned image is displayed on the windshield, luminance of the image is maintained in a predetermined amount without being varied. However, constantly maintaining the luminance of the displayed image results in exhibiting various problems.

At a low speed, the vision aid for displaying the images located in a long distance is unnecessary. The displayed image on the windshield therefore becomes an offending item for the driver when the luminance of the image is constantly maintained. In particular, during low-speed driving in a city, tail lamps of vehicles ahead are constantly displayed on the windshield.

While driving at a curve, the displayed image rapidly flows from side to side, which phenomenon lowers visibility and bothers the driver.

SUMMARY OF THE INVENTION

It is an object of the present invention to provide a vehicular forward-vision display system where luminance of a displayed image is decreased when the displayed image becomes an offending item for a driver.

To achieve the above object, a vehicular forward-vision display system is provided with the following. A night-vision camera is disposed for scanning a nighttime image ahead of a vehicle. A displaying unit is disposed for displaying the scanned nighttime image as a virtual image on a front windshield. Here, luminance intensity of the displayed image is decreased with decreasing vehicle speed.

This structure enables the luminance intensity of the displayed nighttime image to be decreased and prevented from bothering the driver when the vehicle speed is too slow for the vision aid to be much required. In particular, this structure is effective when the vehicle travels around a curve naturally at a lowered speed. The displayed image that traverses from side to side is displayed on the windshield at lowered luminance intensity. This suppresses an offending image on the windshield.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

Figure 1:
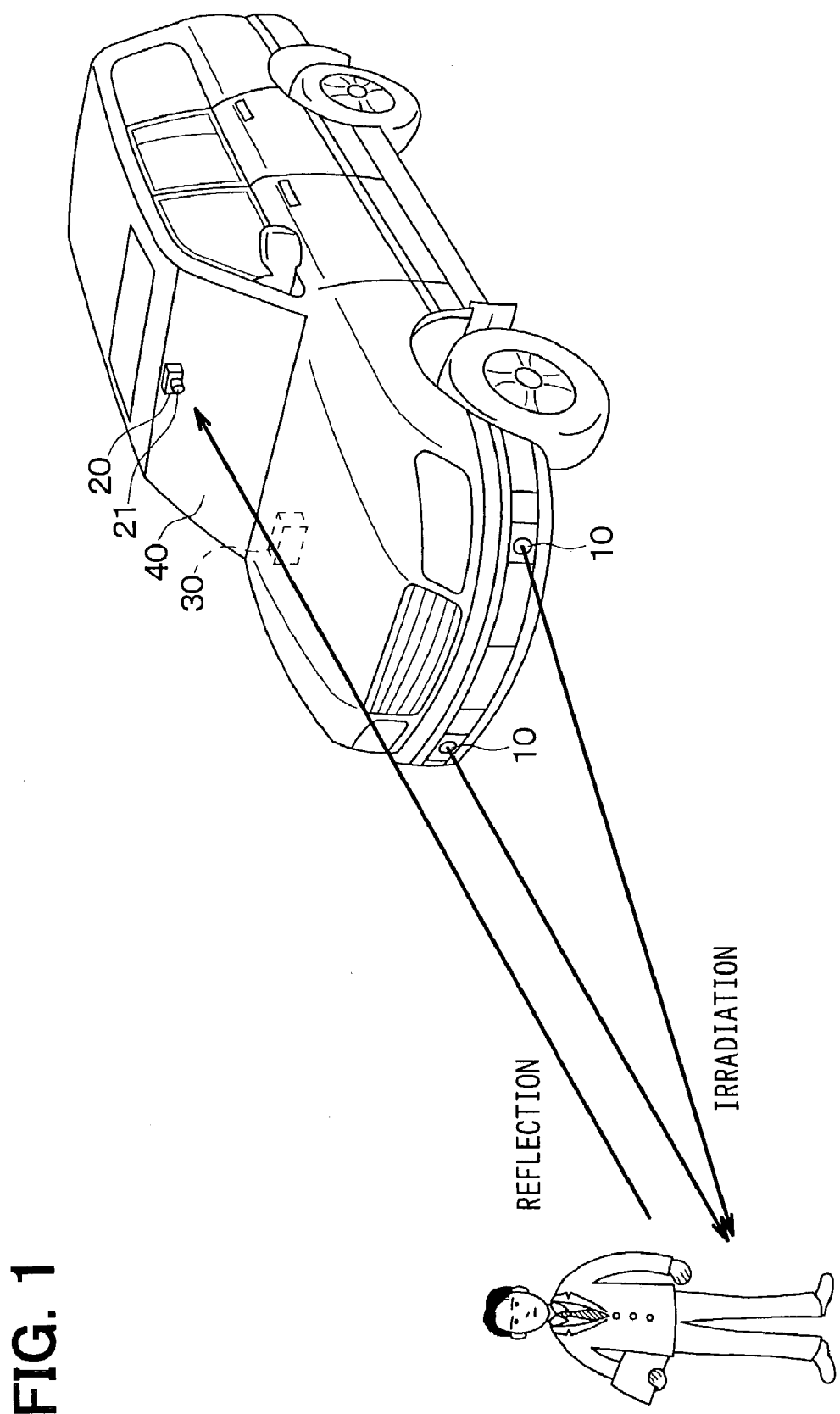
FIG. 1 is a schematic overall perspective view of a vehicular forward-vision display system according to a first embodiment of the present invention.

A vehicular forward-vision display system as a first embodiment of the present invention is directed to a passenger vehicle shown in FIG. 1. The system includes infrared lamps 10 for irradiating a nighttime image ahead of the vehicle by infrared light, a night-vision camera 20 for scanning the nighttime images irradiated by the infrared light, and a head-up display 30 as a displaying device for displaying the scanned images on a front windshield 40 of the vehicle.

The infrared lamps 10 irradiate near-infrared light having a range of wave length between 800 nm and 1000 nm and are disposed under headlights in front of the vehicle.

Figure 2:
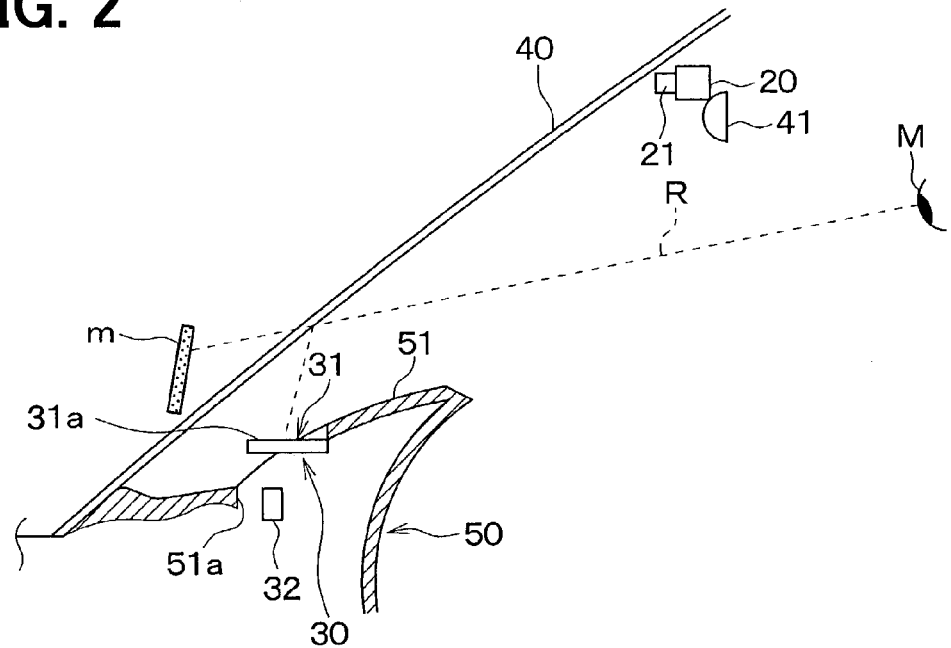
FIG. 2 is a schematic side view of the vehicular forward-vision display system according to the first embodiment.
Figure 3:
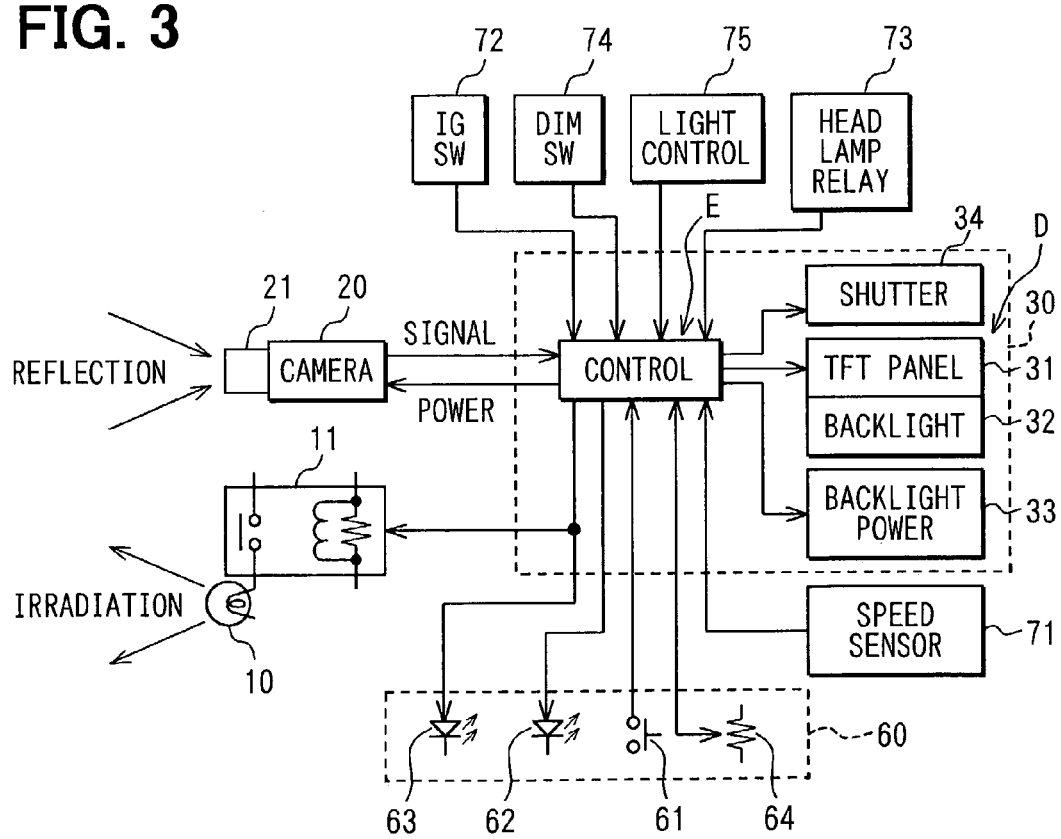
FIG. 3 is a block diagram explaining structure of the vehicular forward-vision display system according to the first embodiment.

The night-vision camera 20 is a known infrared camera that has a telephoto lens 21 and scans an image by accumulating static electricity in proportion to received infrared. The infrared camera 20 is disposed near an upper side of the windshield 40 in an interior of the vehicle and in a rear side of a rearview mirror 41 as shown in FIG. 2.

The infrared camera 20 scans the forward vision of the vehicle through the front windshield 40, and a signal of the scanned image is outputted to the head-up display 30. A known composite video signal Vde is an instance of the signal of the scanned image.

The head-up display 30 includes a displaying unit D and an electronic control circuit E.

The displaying unit D is disposed in an instrument panel 50 that protrudes to the interior of the vehicle from a lower side of the windshield 40. The displaying unit D includes a TFT type liquid crystal display (LCD) panel 31 and a backlight 32. The LCD panel 31 is horizontally sustained in an opening 51a of an upper wall 51 of the instrument panel 50.

The LCD panel 31 receives a light from the backlight 32 and is activated to display a display image on a display window 31a. The display image enters, as a display light, a combiner (not shown) provided in the windshield 40. The combiner then reflects the display light, along a dotted line R in FIG. 2, to eyes of the driver M sitting in the driver's seat. A virtual image n is thereby formed ahead of the windshield 40.

The backlight 32 is sustained in a rear side of the LCD panel 31 and powered by a backlight power 33 to turn on a light that enters the LCD panel 31 from a rear side of the LCD panel 31. The displaying unit D activates the LCD panel 31 using a matrix drive circuit (not shown).

A shutter 34 (not shown) is disposed on an upper side of the LCD panel 31. The shutter 34 is for preventing the LCD panel 31 from being deteriorated due to direct sunlight and is closed when the head-up display 30 is not used.

A manipulation panel 60 is disposed in an area where the driver can manipulate. The manipulation panel 60 includes a main switch 61, a main-switch indicator 62, an infrared-lamp indicator 63, and a rheostat 64.

The main switch 61 is manipulated by the driver for activating or ceasing the forward-vision system to output an ON-OFF signal to the electronic control circuit E. The main-switch indicator 62 is controlled for lighting up when the system is activated. The infrared-lamp indicator 63 is controlled for lighting up when the infrared lamps 10 light up. The rheostat 64 is manipulated by the driver for setting luminance of the displayed image to output, to the electronic control circuit E, a signal corresponding to the set luminance.

The electronic control circuit E receives: a vehicle speed signal detected by a vehicle speed sensor 71; an ON-OFF signal from an ignition switch (IG SW) 72; an ON-OFF sgnal from a head lamp relay 73; a beam selection signal from a dimmer switch (DIM SW) 74; and a day-night detection signal from a light control system 75.

The head lamp relay 73 is disposed in a steering column and operated according to an ON-OFF state of the head lamp switch. The dimmer switch 74 is also disposed in the steering column and manipulated by the driver for selecting a low or high beam to output to the electronic control circuit E a low or high signal, respectively.

The light control system 75 is disposed on the upper wall 51 of the instrument panel 50. It detects whether a predetermined light amount enters or not and outputs a detection signal to the electronic control circuit E.

The electronic control circuit E controls the forward-vision display system for starting when one of five signals is inputted. The five signals are as follows: (1) an ON signal from the ignition switch 72; (2) an ON signal from the main switch 61; (3) an ON signal from the head lamp relay 73; (4) an ON signal from the dimmer switch 74; and (5) a nighttime detection signal from the light control system 75.

Long period irradiation of the infrared from the infrared lamp 10 may harm human's eyes. When the vehicle speed is lower than a certain speed, the infrared may relatively longer enter eyes of people ahead of the vehicle. The electronic control circuit E therefore controls the infrared lamp 10 for turning on only when the vehicle speed is not less than a predetermined speed in addition to the input of one of the above five signals. This thereby prevents the eyes of the people ahead of the vehicle from being harmed.

As explained above, when the forward-vision display system is activated, the forward nighttime image scanned by the infrared camera 20 is displayed as the virtual image on the windshield 20 by the head-up display 30. At this moment, the electronic circuit E controls luminance intensity of the display image for being decreased with decreasing vehicle speed.

In detail, based on the inputted speed signal, an electric voltage applied to the backlight 32 from the backlight power 33 is controlled for the luminance intensity to be decreased with decreasing vehicle speed.

Figure 4:
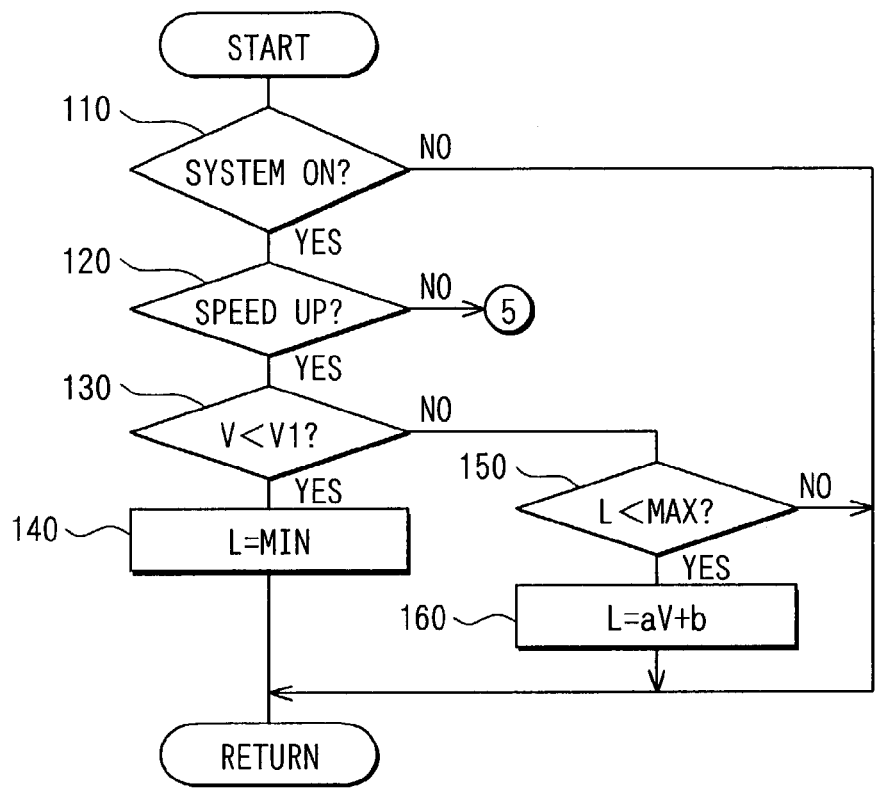
FIG. 4 is a flowchart diagram explaining processing of an electronic control circuit of the vehicular forward-vision display system according to the first embodiment.
Figure 5:
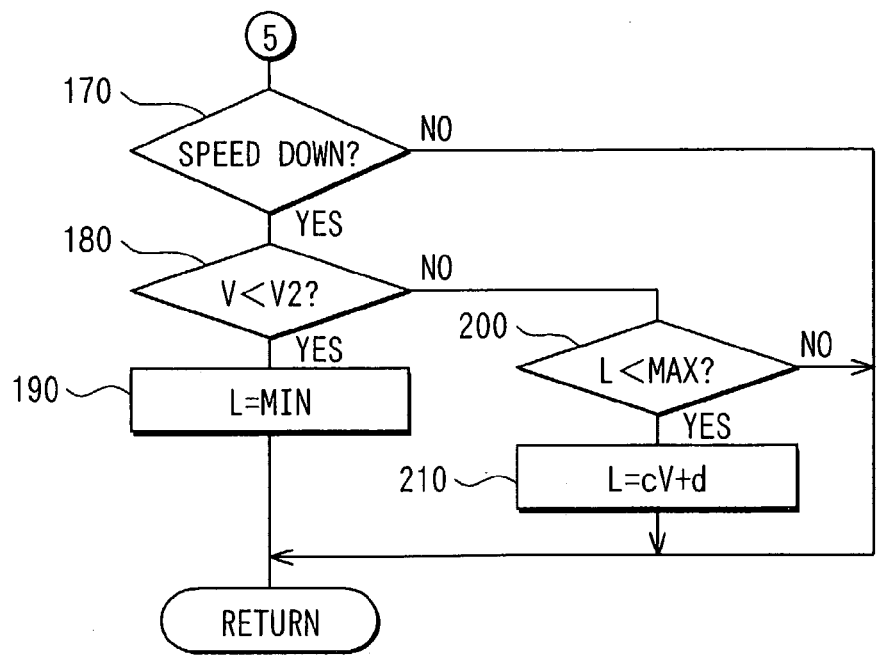
FIG. 5 is a flowchart diagram explaining processing of the electronic control circuit of the vehicular forward-vision display system according to the first embodiment.

A micro-computer of the electronic control circuit E determines the luminance intensity according to the vehicle speed as shown in FIGS. 4 and 5.

At Step 110, whether one of the above five signals is inputted, or whether the forward-vision system is activated is determined. When the forward-vision system is determined to be activated, whether the vehicle speed V is increasing is determined based on the inputted speed signal at Step 120.

When the vehicle speed is determined to be increasing, whether the vehicle speed V is lower than a predetermined speed V1 at Step 130. When the vehicle speed V is determined to be lower than the predetermined speed V1 (V<V1), the luminance intensity is determined to be set in the lowest value (MIN) at Step 140. When the vehicle speed V is determined to be not lower than the predetermined speed V1 (V≧V1), whether the luminance intensity is lower than the highest value (MAX) is determined at Step 150. Here, the highest value is set through manipulation of the rheostat 64. When the luminance intensity is determined to be lower than the highest value, the luminance intensity is determined based on the following formula 1 at Step 160.

$$L=aV+b \quad \text{[Formula 1]}$$

Here, L is luminance intensity, a and b are constant values.

By contrast, when the vehicle speed V is determined to be not increasing at Step 120 and when the vehicle speed V is determined to be decreasing at Step 170, whether the vehicle speed V is lower than a predetermined speed V2 at Step 180. When the vehicle speed V is determined to be lower than the predetermined speed V2 (V<V2), the luminance intensity is determined to be set in the lowest value at Step 190. When the vehicle speed V is determined to be not lower than the predetermined speed V2 (V≧V2), whether the luminance intensity is lower than the highest value is determined at Step 200. When the luminance intensity is determined to be lower than the highest value, the luminance intensity is determined based on the following formula 2 at Step 210.

$$L=cV+d \quad \text{[Formula 2]}$$

Here, L is also luminance intensity, c and d are constant values.

When each determination at Steps 110, 150, 170, and 200 is negated, processing is returned to be repeated. When the vehicle speed does not vary, determinations at Steps 120 and 170 are negated, so that the luminance intensity never varies.

Figure 6:
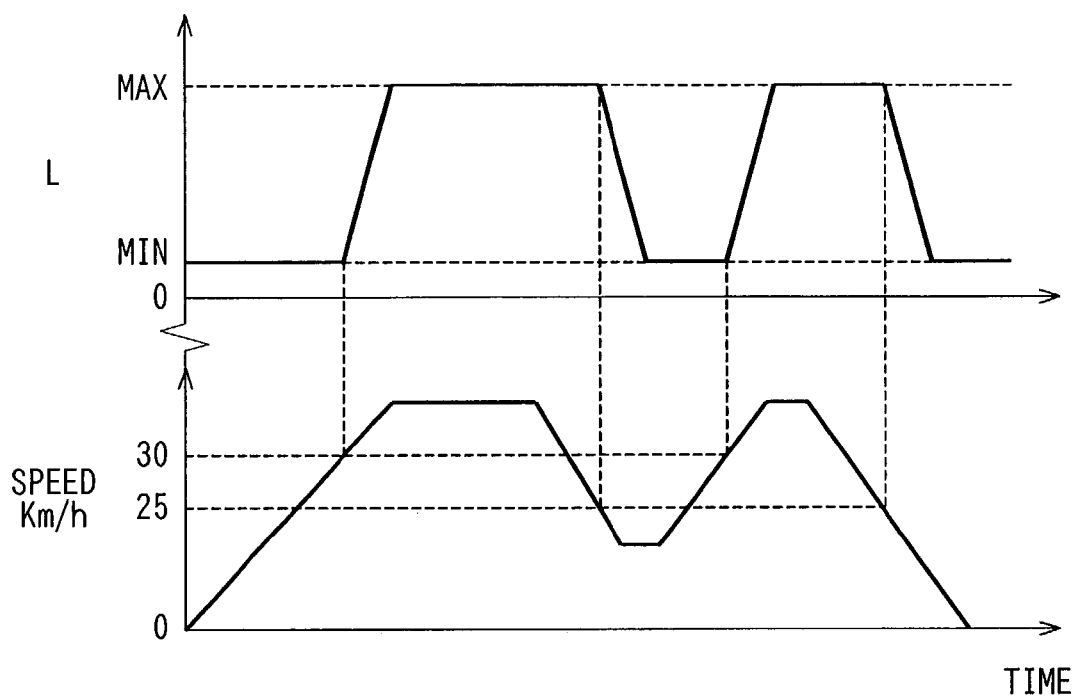
FIG. 6 is a time chart diagram of display luminance according to the first embodiment.

Time chart of the luminance intensity according to the flowcharts shown in FIGS. 4 and 5 as an instance is shown in FIG. 6. Here, the predetermined speed V1 is 30 km/hour while the predetermined speed V2 is 25 km/hour.

Namely, when the vehicle speed increases from 0 km/hour, the luminance intensity remains to be the lowest value until the vehicle speed reaches 30 km/hour and gradually increases to the highest value after the vehicle speed exceeds 30 km/hour. By contrast, when the vehicle speed decreases from greater than 30 km/hour, the luminance intensity remains to be the highest value until the vehicle speed reaches 25 km/hour and gradually decreases to the lowest value after the vehicle speed falls below 25 km/hour.

The vehicle to which the embodiment explained above is directed is supposed to be driven by the driver with the head lamp being turned on along a road at nighttime. Here, as the driver turns on the main switch 61, the forward-vision system is activated and the infrared lamps 10 are turned on when the vehicle speed is higher than a predetermined speed. As the forward-vision system is activated, the main-switch indicator 62 turns on a light. As the infrared lamps 10 turn on the light, the infrared-lamp indicator 63 turns on the light.

The infrared irradiation from the infrared lamps 10 is reflected by a human or an object ahead of the vehicle, so that the reflection is received by the infrared camera 20 through the telephoto lens 21. The human or the object is thereby scanned by the infrared camera 20, which outputs the scanned image as a composite video signal Vde to the electronic control circuit E of the head-up display 30.

The electronic control circuit E controls, based on the inputted video signal Vde, the matrix drive circuit that drives the LCD panel 31. The electronic control circuit E controls the backlight power 33 for aiming at the luminance intensity determined based on the above flowchart.

The forward nighttime image scanned by the infrared camera 20 is projected as a display light on the windshield 40 by the LCD panel 31. The virtual image m formed ahead of the windshield 40 is thereby recognized by the driver. The virtual image works as vision aid for the driver. This results in assisting safe driving.

According to the embodiment, when the vehicle speed is too low for the vision aid to be much required, the luminance intensity of the displayed nighttime image is decreased to be prevented from bothering the driver. In particular, this structure is effective when the vehicle travels around a curve naturally at a lowered speed. The displayed nighttime image that traverses from side to side is displayed on the windshield 40 at lowered luminance intensity for being prevented from giving an offending image to the driver.

(Second Embodiment)

In a second embodiment, the luminance intensity of the displayed image is stepwise varied by determining whether the vehicle speed is higher than a predetermined speed, while it is varied gradually according to the vehicle speed in the first embodiment. In detail, luminance intensity of the displayed image is determined as shown in FIGS. 7 and 8.

Figure 7:
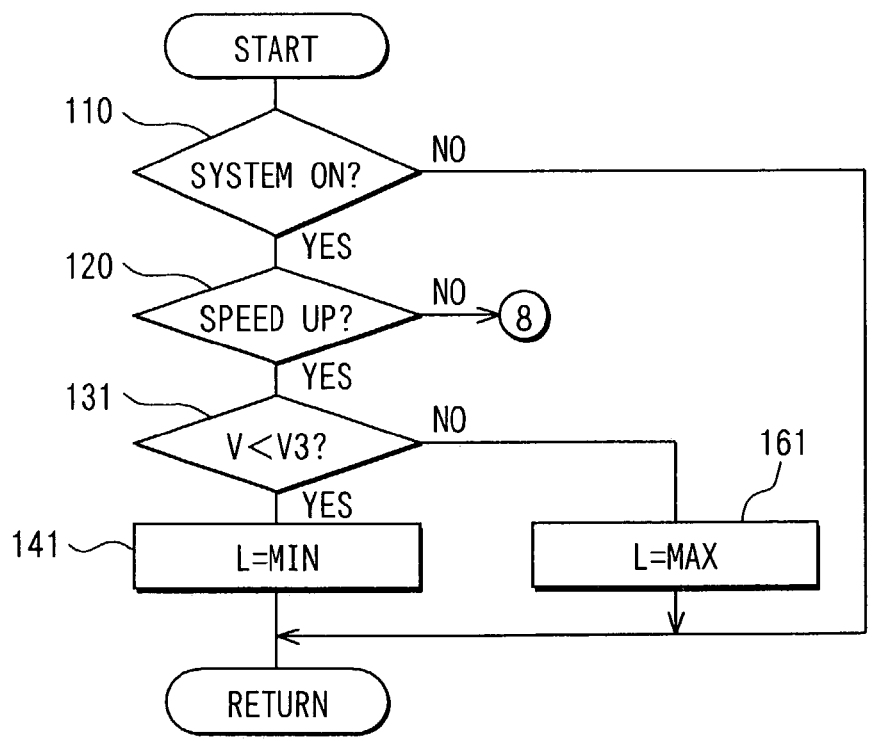
FIG. 7 is a flowchart diagram explaining processing of an electronic control circuit of a vehicular forward-vision display system according to a second embodiment.

At Step 120 in FIG. 7, whether the vehicle speed is increasing is determined. When the vehicle speed is determined to be increasing, whether the vehicle speed is lower than a predetermined speed V3 is determined at Step 131. When the vehicle speed is determined to be lower than the predetermined speed V3 (V<V3), the luminance intensity is determined to be the lowest value (MIN) at Step 141. When the vehicle speed is determined to be not lower than the predetermined speed V3 (V≧V3), the luminance intensity is determined to be the highest value (MAX) at Step 161.

By contrast, when the vehicle speed is determined to be decreasing at Step 170, whether the vehicle speed is lower than a predetermined speed V4 is determined at Step 181. When the vehicle speed is determined to be lower than the predetermined speed V4 (V<V4), the luminance intensity is determined to be the lowest value at Step 191. When the vehicle speed is determined to be not lower than the predetermined speed V4 (V≧V4), the luminance intensity is determined to be the highest value at Step 211.

Figure 8:
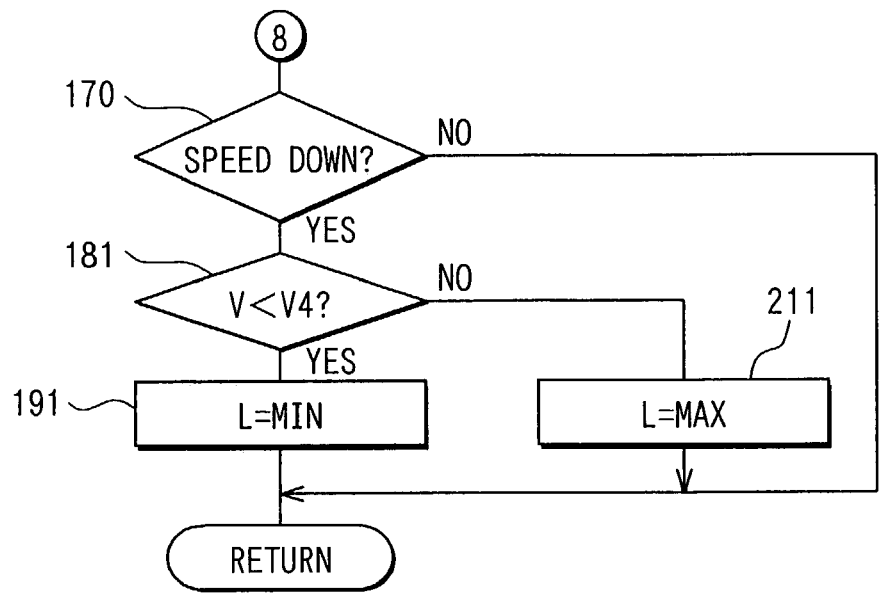
FIG. 8 is a flowchart diagram explaining processing of the electronic control circuit of the vehicular forward-vision display system according to the second embodiment.
Figure 9:
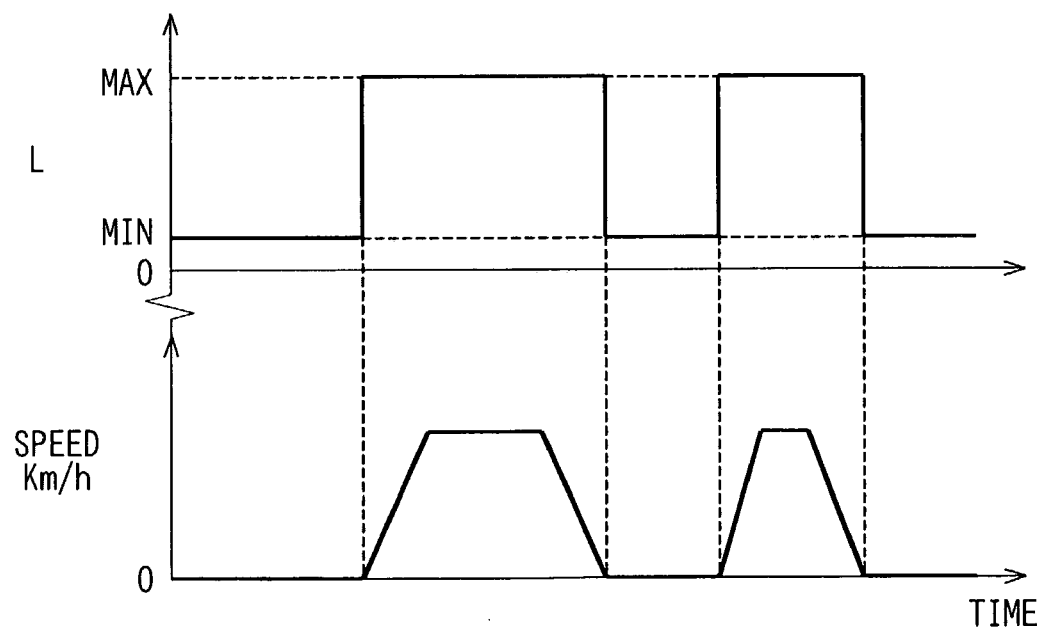
FIG. 9 is a time chart diagram of display luminance according to the second embodiment.

Time chart of the luminance intensity according to the flowcharts shown in FIGS. 7 and 8 as an instance is shown in FIG. 9. Here, the predetermined speeds V3 and V4 are 0 km/hour. Namely, when the vehicle speed is 0 km/hour, the luminance intensity is set to the lowest value. When the vehicle speed is more than 0 km/hour, the luminance intensity is set to the highest value.

Processing other than the determinations mentioned above in the second embodiment is similar to the processing in the first embodiment, so that a similar effect can be obtained.

(Other Modification)

The first and second embodiments can be modified below.

In the two embodiments, the infrared lamp 10 is used to irradiate and the night-vision camera 20 receives, from an object ahead of the vehicle, the reflected portion of the irradiation. However, without installing the infrared lamp 10, the night-vision camera 20 can detect infrared that is naturally radiated from a creature or an object.

Although only one night-vision camera 20 is provided, two night-vision cameras 20 can be simultaneously provided to be used as a stereo camera for scanning ahead of the vehicle.

In the second embodiment, the predetermined speed V3 for a case where the vehicle speed increases and the predetermined speed V4 for a case where the vehicle speed decreases are set to the same value of 0 km/hour. However, the V3 and V4 can be, as matter of course, different values.

What is claimed is:

1. A vehicular forward-vision display system comprising:
    a night-vision camera for scanning a nighttime image ahead of a vehicle;
    a displaying unit for displaying the scanned nighttime image as a virtual image on a front windshield;
    an infrared lamp provided in a front of the vehicle for radiating infrared light on an object ahead of the vehicle; and
    a main switch for activating the vehicular forward-vision display system,
    wherein the infrared lamp is turned on in the case where the vehicle speed is the certain vehicle speed or more while the vehicular forward-vision display system is activated,
    wherein luminance intensity of the displayed image is decreased with decreasing vehicle speed, and
    wherein the night-vision camera is disposed near an upper side of a windshield in an interior of the vehicle for scanning the nighttime image, which is ahead of the vehicle and irradiated with the infrared light radiated by the infrared lamp.

2. A vehicular forward-vision display system according to claim 1,
    wherein the luminance intensity of the displayed image is gradually varied according to the vehicle speed.

3. A vehicular forward-vision display system according to claim 1,
    wherein the luminance intensity of the displayed image is stepwise varied by determining whether the vehicle speed is higher than a predetermined value.

4. A vehicular forward-vision display system according to claim 3,
    wherein the predetermined value is 0 km per hour.

5. A vehicular forward-vision display system comprising:
    a night-vision camera for scanning a nighttime image ahead of a vehicle;
    a display unit for displaying the scanned nighttime image as a displayed image on a front windshield;
    an infrared lamp provided in a front of the vehicle for radiating infrared light ahead of the vehicle; and a main switch for activating the vehicular forward-vision display system, wherein control of the luminance intensity is varied at a first value of the vehicle speed when the vehicle speed is increasing, wherein the control of the luminance intensity is varied at a second value of the vehicle speed different from the first value of the vehicle speed when the vehicle speed is decreasing, wherein the night-vision camera is disposed near an upper side of a windshield in an interior of the vehicle for scanning the nighttime image ahead of the vehicle, the nighttime image capable of including an object ahead of the vehicle irradiated with the infrared light radiated by the infrared lamp, and wherein the infrared lamp is energized when the vehicle speed is at or above a certain vehicle speed and the vehicular forward-vision display system is activated.

6. A vehicular forward-vision display system according to claim 5, wherein the luminance intensity of the displayed image is gradually increased as the vehicle speed increases, and wherein the luminance intensity of the displayed image is gradually decreased as the vehicle speed decreases.

7. A vehicular forward-vision display system according to claim 5, wherein the luminance intensity of the displayed image is stepwise varied.

* * * * *